United States Patent [19]

Kojima

[11] Patent Number: 5,262,867
[45] Date of Patent: Nov. 16, 1993

[54] ELECTRONIC CAMERA AND DEVICE FOR PANORAMIC IMAGING AND OBJECT SEARCHING

[75] Inventor: Kiyonobu Kojima, Kanagawa, Japan

[73] Assignee: Sony Corporation, Japan

[21] Appl. No.: 714,241

[22] Filed: Jun. 12, 1991

[30] Foreign Application Priority Data

Jun. 20, 1990 [JP] Japan .................................. 2-161870

[51] Int. Cl.⁵ ...................... H04N 5/30; H04N 5/225
[52] U.S. Cl. .................................. 358/209; 358/909; 358/906; 354/105
[58] Field of Search ............. 358/909, 209, 227, 906; 354/105, 109, 94; 352/69, 70, 93, 94

[56] References Cited

U.S. PATENT DOCUMENTS

| | | | |
|---|---|---|---|
| 3,528,730 | 9/1970 | Saxon | 352/70 |
| 3,854,802 | 12/1974 | Gazale | 352/94 |
| 4,449,805 | 5/1984 | Sakurada et al. | 354/105 |
| 4,771,307 | 9/1988 | Kuno et al. | 358/909 |
| 4,814,711 | 3/1989 | Olsen et al. | 358/109 |
| 4,814,896 | 3/1989 | Heitzman et al. | 358/103 |
| 4,855,822 | 8/1989 | Narendra et al. | 358/103 |
| 4,991,944 | 2/1991 | Hirao et al. | 358/227 |
| 4,992,859 | 2/1991 | Yoshida | 358/227 |
| 5,045,872 | 9/1991 | Yoshimura et al. | 354/94 |
| 5,045,937 | 9/1991 | Myrick | 358/109 |
| 5,060,001 | 10/1991 | Kaneda | 358/227 |
| 5,072,396 | 12/1991 | Fitzpatrick et al. | 358/103 |
| 5,083,150 | 1/1992 | Nagasaki et al. | 358/227 |

FOREIGN PATENT DOCUMENTS 0141508 5/1985 European Pat. Off. .
59-071581 4/1984 Japan .
63-291018 11/1988 Japan .
2-107985 4/1990 Japan .

OTHER PUBLICATIONS

Telecommunications and Radio Engineering vol. 44, No. 4, Apr. 1, 1989, New York, US pp. 5–7; I. S. Sorokevich: "Coordinate Tying–In of a Television Picture in the case of Remote Sensing of the Earth" pp. 5,1 1–12.

Primary Examiner—Michael T. Razavi
Assistant Examiner—Wendy R. Greening
Attorney, Agent, or Firm—Ronald P. Kananen

[57] ABSTRACT

An electronic camera has sensors for detecting an image of an object, the three dimensional position and azimuth of the camera, the focusing amount and the zoom amount. The image is recorded on a recording medium together with information concerning the three dimensional position and azimuth, the focusing amount and the zoom amount. An image reproducing device for the camera reproduces the recorded image on the basis of the information so that an interrelationship between a plurality of the recorded images is clearly reproduced. Accordingly, the camera and the reproducing device are suitable for combining the recorded images so as to prepare a panoramic image, or to locate a desired article within an image of several different articles.

30 Claims, 5 Drawing Sheets

ELECTRONIC CAMERA AND DEVICE FOR PANORAMIC IMAGING AND OBJECT SEARCHING

BACKGROUND OF THE INVENTION

1. Field of the Invention

This invention relates to an electronic camera which is usable for storing image data on a recording medium together with auxiliary data including information concerning a three dimensional position/direction of the camera, a focusing and a zoom amount of the camera. The invention further relates to an image reproducing device for reproducing the image data stored on the recording medium in association with the auxiliary data such that an interrelationship between a plurality of images being recorded is clarified.

2. Description of the Background Art

In general, many kinds of cameras have been used as an image recording device for storing a reproduceable image of a subject on a record medium. Recently, there has been proposed an electronic camera usable for electronically recording the image on a recording medium such as a floppy disk and/or a memory card. In the electronic camera or a video camera, image information is recorded electronically on the recording medium and is therefore conveniently applicable to various fields and media formats.

However, despite high reproduceability, conventional cameras do not have any mechanism for recording information which relates to the interrelationship between a plurality of images stored on the recording medium, except for the recording date and time. Therefore, when the same portion of the same subject appears in separate images stored on the recording medium, the camera does not have any means by which to register like portions of respective images of the same subject nor to represent combined images smoothly and clearly.

FIG. 6 illustrates a method for preparing a panoramic view using a conventional camera. The camera 101, held in place, records separate images 102a, 102b, 102c and 102d continuously, while changing the camera angle, such that respective images are partially overlapped with adjacent ones.

The images 102a, 102b, 102c, 102d must be combined to produce the panoramic view, by carefully overlapping the same portions of the same subjects which appears in the respective adjacent images.

However, in the conventional method, difficulty is encountered in respect to the following; multiple image recording should be done:
(1) at the same magnification,
(2) in series without any missing image portions,
(3) from the same position without any change in camera direction.

Generally, in the case of continous shots at a given place, it is required to record an image in detail at a high magnification or from various different angles relative to the subject. In conventional systems the above-mentioned points are not completely satisfied. For example, for photographing acheological excavations, or the like, continuous panoramic images are desirable at various scales and from various viewpoints.

In order to eliminate the above inconvenience, conventional cameras require the preparation of a memorandum upon shooting, in which information including a position of the camera, a direction thereof and the like are noted. When such information cannot be exactly noted, a rough schematic drawing incompletely illustrating the position and direction is prepared.

As described in the above, conventionally proposed cameras are not provided with a mechanism for detecting and recording information about a three dimensional position and direction of the camera. Therefore, the camera may not be utilized, for example, for searching articles stored in an office or warehouse.

SUMMARY OF THE INVENTION

It is an object of the present invention to eliminate the disadvantages mentioned above and to provide an electronic camera which records an image on a recording medium together with auxiliary information concerning a three dimensional position of the camera, an azimuth thereof, and the like. It is another object of the invention to provide an image reproducing device which reproduces the image stored on the recording medium in association with such auxiliary information so that an interrelationship between a plurality of recorded images is smoothly integrated.

In order to accomplish these objects, there is provided an electronic camera having a lens section capable of focusing incident light from a subject for recording, which includes first detecting means for detecting an image in response to incident light passing through the lens section, on the basis of which image data is formed, and second detecting means for detecting a three dimensional position at which the camera is located and an azimuth of the camera at the location. Third detecting means for detecting a focusing amount, from which a distance between the camera and the subject is derived, is mounted on the lens section. Fourth detecting means for detecting a zoom amount, from which a zooming magnification is derived, is mounted on the lens section. Further, the camera includes a processing unit for generating auxiliary data corresponding to the image data, on the basis of the three dimensional position and azimuth detected by the second detecting means, the focusing amount and the zoom amount detected by the third detecting means and the fourth detecting means. The processing unit also converts the auxiliary data into magnetically recordable data. Furthermore, a magnetic recording means is provided for recording the image data and the auxiliary data on a recording medium. The magnetic recording means is electrically connected to the first detecting means and through the processing unit to the second, third, fourth detecting means.

In addition, there is provided an image reproducing device for an electronic camera according to the invention, which includes a disk drive for reading out the image data and auxiliary data recorded on the recording medium, and a computer for editing, processing or searching digital signals of the image data read out by said disk drive, on the basis of digital signals of the auxiliary data read out by the disk drive. The reproducing device further includes a memory in which digital signals of the read-out image data and the read-out auxiliary data are stored, and a frame memory in which the digital signals edited, processed or searched by the computer are stored. Further, the reproducing device is provided with a display unit for displaying images according to the image data, and a mouse through which user commands for editing, processing or searching the digital signals of the read-out image data are transmitted to the computer.

BRIEF DESCRIPTION OF THE DRAWINGS

The present invention will be understood from the detailed description given hereinbelow and from the accompanying drawings of the preferred embodiment which are given for explanation and understanding only and are not intended to imply limitation of the invention.

In the drawings:

FIGS. 4(a) to 5(c) are diagrams explaining a search operation of the device according to the invention.

DESCRIPTION OF THE PREFERRED EMBODIMENTS

The preferred embodiment of an electronic camera according to the present invention will now be described with reference to the accompanying drawings.

The embodiment is indicated as an electronic camera utilized as a still picture recording device, though it will be noted that the present invention may be embodied in various other ways.

Figure 1:
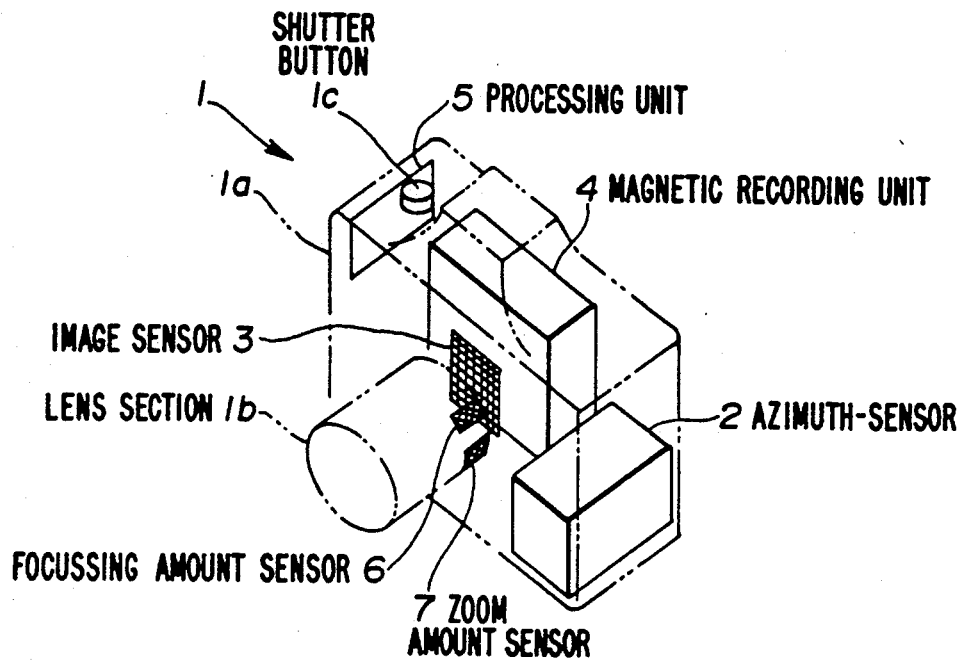
FIG. 1 is a perspective view of one embodiment of an electronic camera according to the invention.
Figure 2:
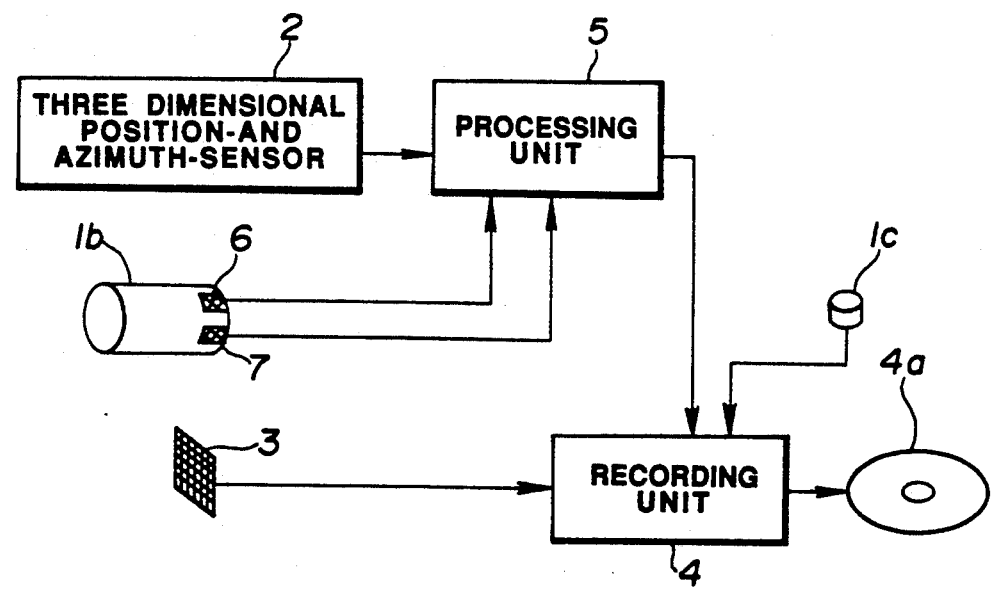
FIG. 2 is a block diagram of the camera shown in FIG. 1.

Referring to FIG. 1, an electronic camera 1 has a camera housing 1a, a lens section 1b having a lens and a shutter button 1c. The housing 1a includes a three dimensional position- and azimuth-sensor 2, an image sensor 3, a magnetic recording unit 4, and a processing unit 5. The lens section 1b including a lens controlling unit is provided with a focusing amount detector 6 and a zoom amount detector 7. As shown in FIG. 2, the shutter button 1c and the image sensor 3 are electrically connected to the magnetic recording unit 4. The image sensor 3 detects an image focussed by manual- or autofocus operation, through the lens section 1b in response to depression of the shutter button 1c and transmits an image signal to the magnetic recording unit 4 where image data corresponding to the image signal is magnetically recorded on a recording medium 4a such as a floppy disk. Further, each of the three dimensional position- and azimuth-sensor 2, the focusing amount detector 6 and the zoom amount detector 7 is electrically connected through the processing unit 5 to the magnetic recording unit 4. The three dimensional position-and azimuth-sensor 2 detects a three dimensional position, in which the camera 1 is located, and an azimuth of the camera 1. Signals corresponding to the detected position and azimuth are transmitted to the processing unit 5. The focusing amount detector 6 detects a focusing amount and transmits a signal indicative thereof to the processing unit 5 where a distance between the camera and the subject is calculated on the basis of the detected focusing amount. The zoom amount detector 7 detects a zoom amount and transmits a zoom amount signal to the processing unit 5 which calculates zoom magnification on the basis of the detected zoom amount. When signals corresponding to the detected focusing amount and the detected zoom amount are transmitted to the processing unit 5, the processing unit 5 generates an auxiliary information signal which is associated with the image now detected at the image sensor. The auxiliary information signal is transmitted to the magnetic recording unit 4 and then stored as auxiliary data together with the associated image data on the record medium 4a. Sensors usable as the sensor 2 of the present invention include a global positioning system which detects three dimensional position and azimuth by analyzing radio waves received from a communications satellite or the like, and a geomagnetic sensor which detects only azimuth. Since the global positioning system has an error range of 10-20 m upon detecting a three dimensional position, it is desirable to employ an ultrasonic sensor when higher sensing accuracy is required. In this case, the ultrasonic sensor detects respective ultrasonic waves emitted from at least three ultrasonic sources arranged at predetermined positions and analyzes the three dimensional position and the azimuth. Additionally, an electromagnetic sensor is applicable, which has three coils would in three different directions. The electromagnetic sensor detects a change in an amount of a current flowing through each coil when receiving radio waves emitted from a source located at a predetermined position. In other words, in the electromagnetic sensor, the three dimensional position and the azimuth are detected as a change in the current in the respective coils.

Figure 3:
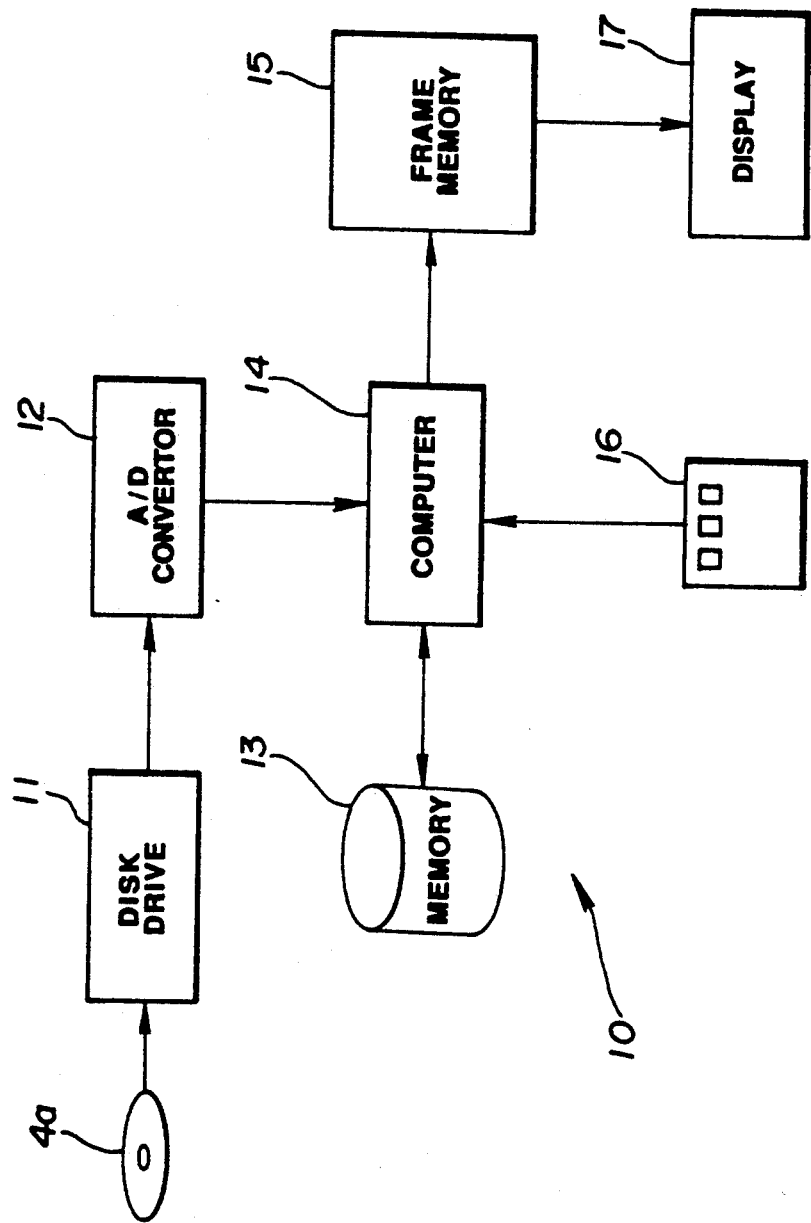
FIG. 3 is a block diagram of one embodiment of an image reproducing device according to the invention.

One preferred embodiment of an image reproducing device for the aforementioned electronic camera, according to the present invention, will be described hereinbelow. FIG. 3 is a block diagram of the image reproducing device. The image reproducing device 10 includes a disk drive 11 for reading out the image data and the associated auxiliary data which are recorded on the recording medium 4a. The image data and the auxiliary data read out from the record medium 4a by the disk drive 11 are transmitted to the computer 14. In the case that the read-out image data is in the form of analog signals, the disk drive 11 is connected to the computer 14 via an A/D convertor 12 which converts analog signals to digital signals. Digital signals of the read-out data or digital signals digitized by the A/D convertor 12 transmitted to the computer 14 are forwarded to a memory 13 in which the digital signals are temporarily stored. Further, the computer 14 is connected to a frame memory 15 and a mouse 16 through which user commands are transmitted to the computer 14. Depending upon the user command, the computer 14 derives digital signals stored in the memory 13 and edits, processes or searches the image data on the basis of the associated auxiliary data stored in the memory 13. The image data edited, processed or searched by the computer 14 is transmitted to the frame memory 15 and stored therein. The frame memory 15 is connected to a display 17. After the digital signals of the image data are converted into analog signals, the image is reproduced on the display 17.

The auxiliary data stored in the recording medium 4a together with the image data includes information such as the three dimensional position at which the camera 1 is located, the azimuth of the camera 1, the distance between the camera 1 and the subject and an angle of visibility. These are calculated by either the processing unit 5 of the camera 1 or the computer 14 of the reproducing device 10 on the basis of respective values detected by the three dimensional position-and azimuth-sensor 2, the focusing amount detector 6 and the zoom amount detector 7. The computer 14 performs various processing of the image data on the basis of the auxiliary data. For instance, the computer 14 combines a plurality of separate images in order to produce a panoramic image, or reduces selected images of selected objects in a chart form on the display. The computer 14 has a capability to zoom in or out on a portion of the image to show same in enlarged or reduced scale, and to mark the subject image area to be affected. In addition, the computer 14 may search for an article, conforming to specific image data in a warehouse or an office, for example.

OPERATION

The aforementioned embodiment of the present invention will be described hereinbelow with respect to its operation and function.

The image sensor 3 of the electronic camera 1 detects an image in response to incident light passing through the lens section 1b. The detected image is transmitted to the magnetic recording unit 4 where the image is recorded as image data on the recording medium 4a. The three dimensional position- and azimuth-sensor 2 detects a three dimensional position and an azimuth of the camera 1 which is located in a predetermined position. The focusing amount detector 6 and the zoom amount detector 7 are provided in the camera 1 and detect a focusing amount and a zoom amount of the camera 1, respectively. The three dimensional position, the azimuth, the focusing amount and the zoom amount detected by the respective sensors and the detectors are transmitted to the processing unit 5. The processing unit 5 calculates the coordinates of the position of the camera 1, the azimuth of the camera, a distance between the camera 1 and the subject, or focal point, and zoom magnification value on the basis of the data transferred from the sensors 2, 6, 7. The processing unit 5 further converts the calculated values into magnetically recordable signals and transmits the signals to the magnetic recording unit 4. The transmitted signals are recorded on the recording medium 4a as auxiliary data together with the image data.

Subsequently, the image data recorded on the recording medium 4a is reproduced by the image reproducing device 10. In this embodiment, a variety of reproductions of the image data are performed by associating with the auxiliary data, in addition to usual reproduction of the image. The image data and the auxiliary data which are recorded in association on the record medium 4a are transmitted to the computer 14 so that the image data may be rearranged or converted by the computer 14 into three dimensional image data.

For example, in the case of preparation of a panoramic image, a plurality of images with various magnification are converted to those having the same magnification, based on the zoom magnification contained in the auxiliary data for each image. The converted image data is stored in the frame memory 15 in association with the position coordinates and the azimuth of the auxiliary data. The image data stored in the frame memory 15 is read out and indicated on the display 17 in a scrollable manner to form a panoramic image. In this case, if desired, the image may be zoomed so as to be magnified. Further, if the image data stored in the frame memory 15 has a large zoom magnification, details of the image subject can be conveniently observed.

Figure 4:
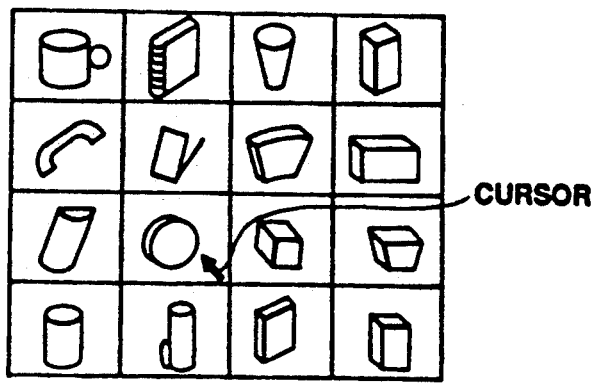
Figure 4:
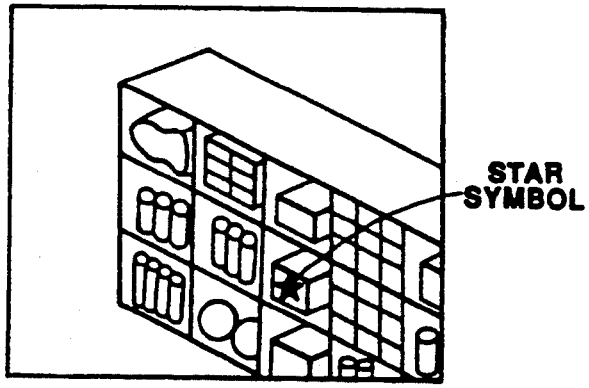
Figure 4:
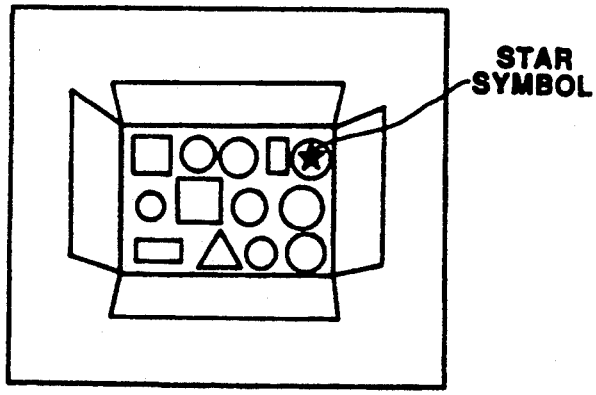

FIGS. 4(a) to 4(c) are directed to a process of searching for an article stored in such a place as a warehouse. Referring to FIG. 4(a), reduced images of articles are represented together in the form of a table on the display 17. A user finds a desired article in the table and marks the article by moving a cursor with the mouse 16. The computer 14 calculates the coordinates of the position of the marked article in accordance with the auxiliary data associated with the image data, which includes a three dimensional position of the camera, an azimuth of the camera and a distance between the camera and the article. A point based on the coordinate of the position is plotted in a whole image in which the article in concern appears together with other surrounding articles, by placing a mark such as a star as illustrated in FIG. 4(b). To this end, the desired article is correctly searched for among other articles throughout the above-mentioned chart form of display. As shown in FIG. 4(c), a star symbol is positioned on the desired article which is present, in this example, together with other articles in a carton or box. As shown in each of FIGS. 4(b) and 4(c), the article in concern is in a position marked with the star symbol. Thus, the desired article is searched out from a plurality of articles which are accommodated in the same place.

Figure 5A:
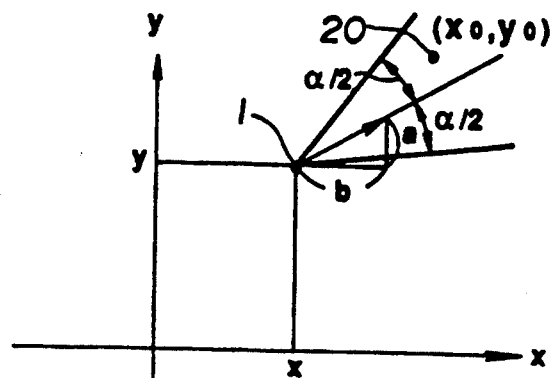
Figure 5B:
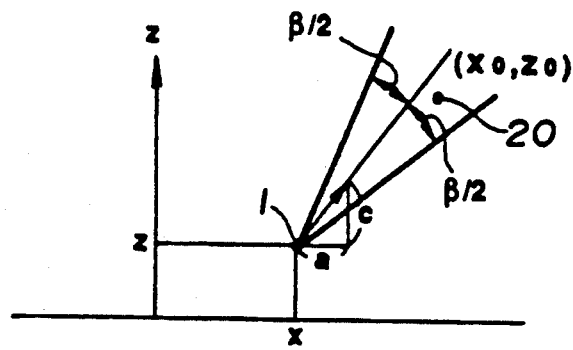
Figure 5C:
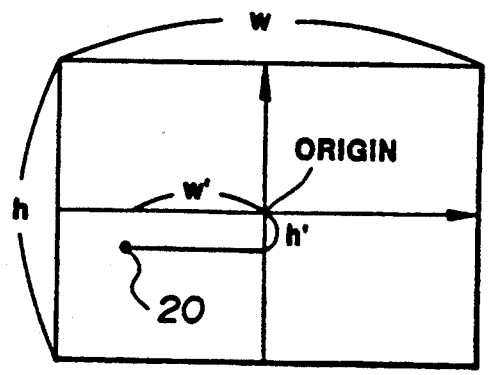
Figure 6:
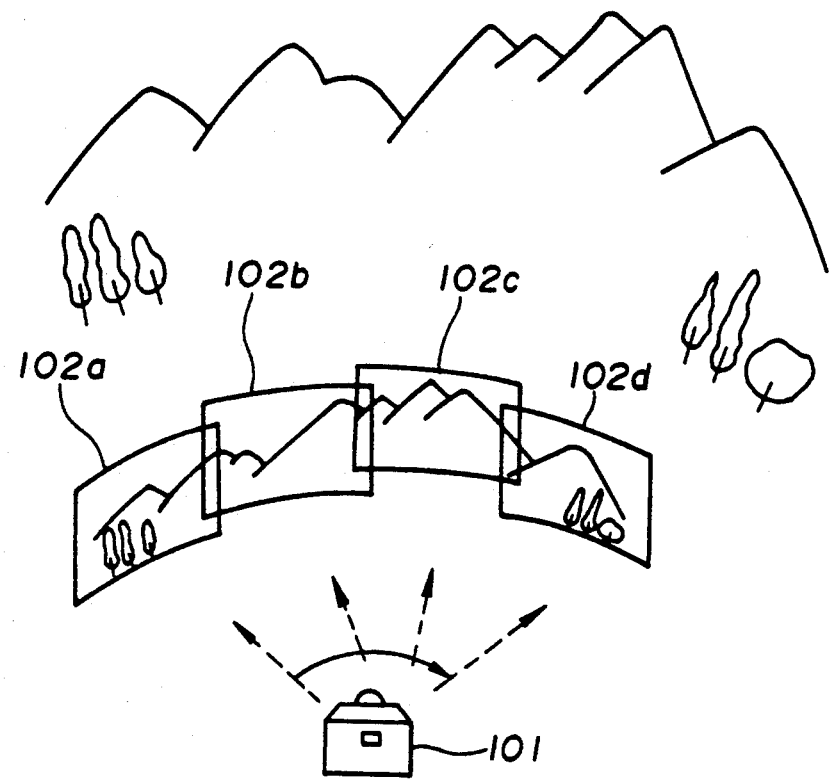
FIG. 6 is a diagram for explaining an image-combining operation of an electronic camera according to the prior art.

In the search for the desired article as mentioned above, FIGS. 5(a) to 5(c) illustrate a process for judging whether or not the target article exists in an image in which a plurality of articles appear. The FIG. 5(a) is a top view showing an arrangement of the camera 1 and an article 20 which are in the same x-y plane. FIG. 5(b) is a side view showing the same arrangement as that of FIG. 5(a). FIG. 5(c) shows the coordinates of the position of the article plotted in an image which is formed by pixel w in the transverse direction and pixel h in the longitudinal direction. In the diagrams, an X-axis extends perpendicular to the Y-axis in the horizontal direction so as to define a flat plane. An Z-axis extends from a point of intersection of the X-axis and the Y-axis in the vertical direction and perpendicular to the flat x-y plane. If the point of intersection is taken as an origin, the coordinate of the position of the article is represented as $(x_0, y_0, z_0)$ and the coordinates of the position of the camera is represented as $(x, y, z)$ in the image. A direction vector of the camera is represented as $(a, b, c)$. A horizontal direction angle of view of the camera is represented as $\alpha$ while a vertical direction angle is represented as $\beta$. In this case, it is assumed that the coordinate of the position of the article exists in the image when the following expression is satisfied:

$$\frac{a(x_o - x) + b(y_o - y)}{\sqrt{a^2 + b^2} \cdot \sqrt{(x_o - x)^2 + (y_o - y)^2}} > \cos\left(\frac{\alpha}{2}\right) \quad (1)$$

$$\frac{a(x_o - x) + c(z_o - z)}{\sqrt{a^2 + c^2} \cdot \sqrt{(x_o - x)^2 + (z_o - z)^2}} > \cos\left(\frac{\beta}{2}\right) \quad (2)$$

where, $0° < \alpha, \beta < 180°$.

Further, as shown in FIG. 5(c), when the center of an image is taken as an origin point, the position of the article is plotted by its coordinates (w', h') in the image which are obtained by the following expressions:

$$w' = \frac{w}{2\alpha} \cdot \cos^{-1} \frac{a(x_o - x) + b(y_o - y)}{\sqrt{a^2 + b^2} \cdot \sqrt{(x_o - x)^2 + (y_o - y)^2}} \quad (3)$$

$$h' = \frac{h}{2\beta} \cdot \cos^{-1} \frac{a(x_o - x) + c(z_o - z)}{\sqrt{a^2 + c^2} \cdot \sqrt{(x_o - x)^2 + (z_o - z)^2}} \quad (4)$$

With respect to w' of the above expression, if $a(y_0-y)-b(x_0-x)$ has a positive value, then the $\cos^{-1}$ function of that expression also has a positive value. Conversely, if $a(y_0-y)-b(x_0-x)$ has a negative, the $\cos^{-1}$ function of that expression also has a negative value.

With respect to h' of the expression, if $a(z_0-z)-c(x_0-x)$ has a positive value, $\cos^{-1}$ has a positive value. If $a(z_0-z)-c(x_0-x)$ has a negative value, the $\cos^{-1}$ function of the expression has a negative value.

The present invention is not limited only to an electronic camera for a still photograph recording but is further applicable for a moving-image recording device such as a video camera. In addition, according to the present invention, the three dimensional position is accurately detected by an image processing or a stereopsia generation which is realized by collating and correcting the data concerning a position of the camera and the subject. To this end, simulation of a free navigation in three dimensional space is realized in addition to the search for the article as mentioned on the above. Although the preferred embodiment of the invention utilizes all information of the auxiliary data concerning the position and direction of the camera, the focusing amount and the zoom amount, it will be apparent that the invention may employ all or some of the information or a combination thereof. Accordingly, many modifications and variations can be effected by one skilled in the art without departing from the spirit or scope of the invention as defined in the appended claims.

As is obvious from the aforementioned description of the preferred embodiment of the invention, the electronic camera is capable of immediately and simultaneously recording a plurality of images which are concerned with each other with respect to the same subject. Further, the image reproducing device reproduces the image on the basis of the auxiliary data. Accordingly, depending upon such a data storage function of the camera, a position of each article accommodated in such a place as a warehouse can be surely found out without any direct visual detection of the article so that convenient arrangement or storage of articles is effectively realized. Moreover, the individual images being recorded are three-dimensionally reproduceable and usable for a wide variety of applications.

What is claimed is:

1. An electronic camera comprising:

a lens section capable of focusing incident light having an image of a subject to be recorded;

first detecting means for detecting the image of the subject in response to the incident light passing through said lens section, on the basis of which respective image data is formed for each said image;

second detecting means for detecting, for each said image, data representing the three dimensional position at which the camera is located and the pointing direction of the camera;

third detecting means for detecting, for each said image, data representing the the focusing amount of the electronic camera from which a distance between the camera and the subject can be derived;

fourth detecting means for detecting, for each said image, data representing the zoom amount of the electronic camera from which zoom magnification can be derived;

a processing unit for generating auxiliary data in association with the image data, on the basis of said data detected by said second, third and fourth detecting means; and magnetic recording means for recording said image data with said auxiliary data thereof on a recording medium within said electronic camera.

2. The electronic camera according to claim 1, wherein said lens section includes control means for controlling said focusing amount and said zoom amount, and said fourth detecting means is mounted on said lens section.

3. An image reproducing device for the electronic camera according to claim 1, comprising:

a disk drive for reading out said image data and said auxiliary data which are recorded on said recording medium;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored; and a display unit for displaying said image data stored in said frame memory.

4. The image reproducing device according to claim 3, wherein said computer is used as said processing unit for the electronic camera.

5. The electronic camera according to claim 1, wherein said magnetic recording means are electrically connected to said first detecting means and through said processing unit to said second, third and fourth detecting means.

6. The electronic camera according to claim 1, wherein said second detecting means comprises global positioning means responsive to satellite signals for said detecting of said data representing said three dimensional position of the electronic camera.

7. The electronic camera according to claim 6, wherein said second detecting means comprises geomagnetic sensing means for said detecting of said pointing direction of the electronic camera.

8. The electronic camera according to claim 1, wherein said second detecting means comprises ultrasonic means for said detecting of said data representing said three dimensional position and pointing direction of the electronic camera.

9. The electronic camera according to claim 1, wherein said second detecting means comprises electromagnetic coil means for said detecting of said data representing said three dimensional position and pointing direction of the electronic camera.

10. The electronic camera according to claim 1, wherein:

said processing unit reduces said detected data from said second, third and fourth detecting means to values indicative of said three dimensional position, pointing direction, focus amount and zoom amount, and said indicative values of said three dimensional position, pointing direction, focus amount and zoom amount being stored on said magnetic recording medium.

11. The image reproducing device according to claim 3, wherein:
said electronic camera is a video camera for generating a moving sequence of said images and the corresponding auxiliary data; and
wherein, for searching for a desired object among a plurality of different objects, said disk drive, computer, memory, frame memory and display unit are such that:
a sequence of displays can be constructed corresponding to free navigation in three dimensions;
whereby a desired article can be searched for among a plurality of articles without direct visual detection of the desired article at the time of searching.

12. The image reproducing device according to claim 11, wherein said free navigation at searching for said desired article comprise use of the formulas of equations (1) to (4):

$$\frac{a(x_o - x) + b(y_o - y)}{\sqrt{a^2 + b^2} \cdot \sqrt{(x_o - x)^2 + (y_o - y)^2}} > \cos\left(\frac{\alpha}{2}\right) \quad (1)$$

$$\frac{a(x_o - x) + c(z_o - z)}{\sqrt{a^2 + c^2} \cdot \sqrt{(x_o - x)^2 + (z_o - z)^2}} > \cos\left(\frac{\beta}{2}\right) \quad (2)$$

$$w' = \frac{w}{2\alpha} \cdot \cos^{-1} \frac{a(x_o - x) + b(y_o - y)}{\sqrt{a^2 + b^2} \cdot \sqrt{(x_o - x)^2 + (y_o - y)^2}} \quad (3)$$

$$h' = \frac{h}{2\beta} \cdot \cos^{-1} \frac{a(x_o - x) + c(z_o - z)}{\sqrt{a^2 + c^2} \cdot \sqrt{(x_o - x)^2 + (z_o - z)^2}} \quad (4)$$

wherein:
x, y, and z denote mutually perpendicular axes;
xo, yo, and zo denote coordinates on the x, y and z axes;
a, b, c denote camera direction vectors;
$\alpha$ denotes the horizontal direction angle of camera view;
$\beta$ denotes the vertical direction of camera view.

13. An electronic camera comprising:
a lens section capable of focusing incident light having an image of a subject to be recorded;
first detecting means for detecting the image of the subject in response to the incident light passing through said lens section, on the basis of which respective image data is formed for each said image;
second detecting means for detecting, for each said image, data representing the three dimensional position at which the camera is located and the pointing direction of the camera;
third detecting means for detecting, for each said image, data representing the focusing amount of the electronic camera from which a distance between the camera and the subject can be derived;
fourth detecting means for detecting, for each image, data representing the zoom amount of the electronic camera from which the zoom magnification can be derived;
a processing unit for generating auxiliary data in association with the image data, on the basis of said data detected by said second, third and fourth detecting means; and
magnetic recording means for recording said image data with said auxiliary data thereof on a recording medium within said electronic camera;
a disk drive for reading out said image data and said auxiliary data which are recorded on said recording medium;
a computer for editing, processing or searching said image data read out by said disk drive, on the basis of said auxiliary data read out by said disk drive;
a memory in which said read-out image data and said read-out auxiliary data are stored;
a frame memory in which said image data edited, processes or searched by said computer are temporarily stored;
a display unit for displaying said image data stored in said frame memory; further comprising a pointing device, wherein, for searching for a desired object among a first plurality of different objects, said disk drive, computer, memory, frame memory and display unit are such that:
a first display can be constructed comprising a reduced image of each said object, with all of said reduced images arranged in table form, each said reduced image having been obtained from a respective image of said electronic camera with the corresponding auxiliary data;
said desired one of said objects can be selected from said display with said pointing device; and
a second display is produced showing a second plurality of objects which includes said desired object, said second display being at least in part an image detected by said camera and selected by said computer on the basis of its respective auxiliary data; and
the location where said desired object is located in said image of said second display is indicated at that location by a predetermined marking at that position, as a result of said selecting by said pointing device from said first display.

14. An electronic camera comprising:
a lens section capable of focusing incident light having an image of a subject to be recorded;
first detecting means for detecting the image of the subject in response to the incident light passing through said lens section, on the basis of which respective image data is formed for each said image;
second detecting means for detecting, for each said image, data representing the three dimensional position at which the camera is located and the pointing direction of the camera;
third detecting means for detecting, for each said image, data representing the focusing amount of the electronic camera from which a distance between the camera and the subject can be derived;
fourth detecting means for detecting, for each image, data representing the zoom amount of the electronic camera from which the zoom magnification can be derived;
a processing unit for generating auxiliary data in association with the image data, on the basis of said data detected by said second, third and fourth detecting means; and
magnetic recording means for recording said image data with said auxiliary data thereof on a recording medium within said electronic camera;

a disk drive for reading out said image data and said auxiliary data which are recorded on said recording medium;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored;

a display unit for displaying said image data stored in said frame memory; and wherein said disk drive, computer, memory, frame memory and display unit are such that said display unit can show a panoramic image formed from a plurality of the images obtained with said auxiliary data by said electronic camera.

15. The image reproducing device according to claim 14, wherein said panoramic image can be scrolled.

16. The image reproducing device according to claim 15, wherein:

said electronic camera is a video camera for generating a moving sequence of said images and the corresponding auxiliary data; and wherein, for searching for a desired object among a plurality of different objects, said disk drive, computer, memory, frame memory and display unit are such that:

a sequence of displays can be constructed corresponding to free navigation in three dimensions;

whereby a desired article can be searched for among a plurality of articles without direct visual detection of the desired article at the time of searching.

17. The image reproducing device according to claim 16, wherein said free navigation at searching for said desired article comprise use of the formulas of equations (1) to (4):

$$\frac{a(x_o - x) + b(y_o - y)}{\sqrt{a^2 + b^2} \cdot \sqrt{(x_o - x)^2 + (y_o - y)^2}} > \cos\left(\frac{\alpha}{2}\right) \quad (1)$$

$$\frac{a(x_o - x) + c(z_o - z)}{\sqrt{a^2 + c^2} \cdot \sqrt{(x_o - x)^2 + (z_o - z)^2}} > \cos\left(\frac{\beta}{2}\right) \quad (2)$$

$$w' = \frac{w}{2\alpha} \cdot \cos^{-1} \frac{a(x_o - x) + b(y_o - y)}{\sqrt{a^2 + b^2} \cdot \sqrt{(x_o - x)^2 + (y_o - y)^2}} \quad (3)$$

$$h' = \frac{h}{2\beta} \cdot \cos^{-1} \frac{a(x_o - x) + c(z_o - z)}{\sqrt{a^2 + c^2} \cdot \sqrt{(x_o - x)^2 + (z_o - z)^2}} \quad (4)$$

wherein:

x, y, and z denote mutually perpendicular axes;

xo, yo, and zo denote coordinates on the x, y and z axes;

a, b, c denote camera direction vectors;

$\alpha$ denotes the horizontal direction angle of camera view;

$\beta$ denotes the vertical direction of camera view.

18. An electronic camera comprising:

a lens section capable of focusing incident light having an image of a subject to be recorded;

first detecting means for detecting the image of the subject in response to the incident light passing through said lens section, on the basis of which respective image data is formed for each said image;

second detecting means for detecting, for each said image, data representing the three dimensional position at which the camera is located and the pointing direction of the camera;

third detecting means for detecting, for each said image, data representing the focusing amount of the electronic camera from which a distance between the camera and the subject can be derived;

fourth detecting means for detecting, for each image, data representing the zoom amount of the electronic camera from which the zoom magnification can be derived;

a processing unit for generating auxiliary data in association with the image data, on the basis of said data detected by said second, thrid and fourth detecting means; and magnetic recording means for recording said image data with said auxiliary data thereof on a recording medium within said electronic camera;

a disk drive for reading out said image data and said auxiliary data which are recorded on said recording medium;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored;

a display unit for displaying said image data stored in said frame memory; and wherein said panoramic image can be zoomed.

19. An image reproducing device comprising:

a disk drive for reading out image data of each of a plurality of images and corresponding auxiliary data for each said image which are recorded on a recording medium, said auxiliary data comprising information for determining position, pointing direction, focus amount and zoom amount of a camera taking each said image to provide said image data, and;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer is temporarily stored; and a display unit for displaying said image data stored in said frame memory;

said image reproducing device further comprising a pointing device, wherein, for searching for a desired object among a first plurality of different objects, said disk drive, computer, memory, frame memory and display unit are such that:

a first display can be constructed comprising at least a reduced image of each said object, with all of said reduced images arranged in table form, each said reduced image having been obtained from a respective image of said camera with the corresponding auxiliary data;

said desired one of said objects can be selected from said first display with said pointing device; and a second display is produced showing a second plurality of objects which includes said desired object, said second display being at least in part an image detected by said camera and selected by said computer on the basis of its respective auxiliary data; and the location where said desired object is located in said image of said second display is indicated at that location by a predetermined marking at that position, as a result of said selecting by said pointing device from said first display.

20. The image reproducing device according to claim 19, wherein:

said camera is a video camera for generating a moving sequence of said images and the corresponding auxiliary data; and wherein, for searching for a desired object among a plurality of different objects, said drive, computer, memory, frame memory and display unit are such that:

a sequence of displays can be constructed corresponding to free navigation in three dimensions;

whereby a desired article can be searched for among a plurality of articles without direct visual detection of the desired article at the time of searching.

21. An image reproducing device comprising:

a disk drive for reading out image data of each of a plurality of images and corresponding auxiliary data for each said image which are recorded on a recording medium, said auxiliary data comprising information for determining at least one of the position, pointing direction, focus amount or zoom amount of a camera taking each said image to provide said image data, and;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored; and a display unit for displaying said image data stored in said frame memory; and wherein said disk drive, computer, memory, frame memory and display unit are such that said display unit can show a panoramic image formed from a plurality of the images obtained with said auxiliary data by said electronic camera.

22. The image reproducing device according to claim 21, wherein said panoramic image can be zoomed.

23. The image reproducing device according to claim 21, wherein said panoramic image can be scrolled.

24. An image reproducing device comprising:

a disk drive for reading out image data of each of a plurality of images and corresponding auxiliary data for each said image which are recorded on a recording medium, said auxiliary data comprising information for determining at least one of the position, pointing direction, focus amount or zoom amount of a camera taking each said image to provide said image data, and;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored; and a display unit for displaying said image data stored in said frame memory, wherein: said electronic camera is a video camera for generating a moving sequence of said images and the corresponding auxiliary data; and wherein, for searching for a desired object among a plurality of different objects, said disk drive, computer, memory, frame memory and display unit are such that:

a sequence of displays can be constructed corresponding to free navigation in three dimensions;

whereby a desired article can be searched for among a plurality of articles without direct visual detection of the desired article at the time of searching; and, wherein said free navigation at searching for said desired article comprise use of the formulas of equations (1) to (4):

$$\frac{a(x_o - x) + b(y_o - y)}{\sqrt{a^2 + b^2} \cdot \sqrt{(x_o - x)^2 + (y_o - y)^2}} > \cos\left(\frac{\alpha}{2}\right) \quad (1)$$

$$\frac{a(x_o - x) + c(z_o - z)}{\sqrt{a^2 + c^2} \cdot \sqrt{(x_o - x)^2 + (z_o - z)^2}} > \cos\left(\frac{\beta}{2}\right) \quad (2)$$

$$w' = \frac{w}{2\alpha} \cdot \cos^{-1}\frac{a(x_o - x) + b(y_o - y)}{\sqrt{a^2 + b^2} \cdot \sqrt{(x_o - x)^2 + (y_o - y)^2}} \quad (3)$$

$$h' = \frac{h}{2\beta} \cdot \cos^{-1}\frac{a(x_o - x) + c(z_o - z)}{\sqrt{a^2 + c^2} \cdot \sqrt{(x_o - x)^2 + (z_o - z)^2}} \quad (4)$$

wherein:

x, y, and z denote mutually perpendicular axes;

$x_0$, $y_0$, and $z_0$ denote coordinates on the x, y and z axes;

a, b, c denote camera direction vectors;

$\alpha$ denotes the horizontal direction angle of camera view;

$\beta$ denotes the vertical direction of camera view.

25. An image reproducing device comprising:

a disk drive for reading out image data of each of a plurality of images and corresponding auxiliary data for each said image which are recorded on a recording medium, said auxiliary data comprising information for determining at least one of the position, pointing direction, focus amount or zoom amount of a camera taking each said image to provide said image data, and;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored;

a display unit for displaying said image data stored in said frame memory, wherein: said electronic camera is a video camera for generating a moving sequence of said images and the corresponding auxiliary data;

wherein, for searching for a desired object among a plurality of different objects, said disk drive, computer, memory, frame memory and display unit are such that:

a sequence of displays can be constructed corresponding to free navigation in three dimensions;

whereby a desired article can be searched for among a plurality of articles without direct visual detection of the desired article at the time of searching; and wherein said free navigation at searching for said desired article comprise use of the formulas of equations (1) to (4)

$$\frac{a(x_o - x) + b(y_o - y)}{\sqrt{a^2 + b^2} \cdot \sqrt{(x_o - x)^2 + (y_o - y)^2}} > \cos\left(\frac{\alpha}{2}\right) \quad (1)$$

$$\frac{a(x_o - x) + c(z_o - z)}{\sqrt{a^2 + c^2} \cdot \sqrt{(x_o - x)^2 + (z_o - z)^2}} > \cos\left(\frac{\beta}{2}\right) \quad (2)$$

$$w' = \frac{w}{2\alpha} \cdot \cos^{-1}\frac{a(x_o - x) + b(y_o - y)}{\sqrt{a^2 + b^2} \cdot \sqrt{(x_o - x)^2 + (y_o - y)^2}} \quad (3)$$

$$h' = \frac{h}{2\beta} \cdot \cos^{-1}\frac{a(x_o - x) + c(z_o - z)}{\sqrt{a^2 + c^2} \cdot \sqrt{(x_o - x)^2 + (z_o - z)^2}} \quad (4)$$

wherein:

x, y, and z denote mutually perpendicular axes;

$x_0$, $y_0$, and $z_0$ denote coordinates on the x, y and z axes;

a, b, c denote camera direction vectors;

$\alpha$ denotes the horizontal direction angle of camera view;

$\beta$ denotes the vertical direction of camera view.

26. An apparatus comprising an electronic camera and an image reproducing device, said electronic camera comprising:

a lens section capable of focusing incident light having an image of a subject to be recorded;

first detecting means for detecting the image of the subject provided by said lens section, on the basis of which respective image data is formed for each said image, second, third and fourth detecting means, said second detecting means being for detecting, for each said image, data representing the three dimensional position at which the camera is located and the pointing direction of the camera, said third detecting means being for detecting, for each said image, data representing the focusing amount of the electronic camera from which a distance between the camera and the subject can be derived, said fourth detecting means for detecting, for each said image, data representing the zoom amount of the electronic camera from which zoom magnification can be derived;

a processing unit for generating auxiliary data in association with the image data, on the basis of said data detected by said each said second, third and fourth detecting means;

magnetic recording means for recording said image data with said auxiliary data thereof on a recording medium within said electronic camera; and said image reproducing device comprising:

a disk drive for reading out said image data and said auxiliary data which are recorded on said recording medium;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored; and a display unit for displaying said image data stored in said frame memory.

27. The apparatus according to claim 26, wherein said computer is used as said processing unit for the electronic camera.

28. An electronic camera and an image reproducing device, said electronic camera comprising:

a lens section capable of focusing incident light having an image of a subject to be recorded;

first detecting means for detecting the image of the subject provided by said lens section, on the basis of which respective image data is formed for each said image, second, third and fourth detecting means, said second detecting means being for detecting, for each said image, data representing the three dimensional position at which the camera is located and the pointing direction of the camera, said third detecting means being for detecting, for each said image, data representing the focusing amount of the electronic camera from which a distance between the camera and the subject can be derived, said fourth detecting means for detecting, for each said image, data representing the zoom amount of the electronic camera from which zoom magnification can be derived;

a processing unit for generating auxiliary data in association with the image data, on the basis of said data detected by said each said second, third and fourth detecting means; and magnetic recording means for recording said image data with said auxiliary data thereof on a recording medium within said electronic camera.

29. The electronic camera according to claim 28, comprising at least two of said second, third and fourth means, said auxiliary data comprising the respective data from said at least two of said second, third and fourth means.

30. An image reproducing device comprising:

a disk drive for reading out image data of each of a plurality of images and corresponding auxiliary data for each said image which are recorded on a recording medium, said auxiliary data comprising information for determining at least two of the position, pointing direction, focus amount or zoom amount of a camera taking each said image to provide said image data, and;

a computer for editing, processing or searching said image data read out by said disk drive, on the basis of said auxiliary data read out by said disk drive;

a memory in which said read-out image data and said read-out auxiliary data are stored;

a frame memory in which said image data edited, processed or searched by said computer are temporarily stored;

a display unit for displaying said image data stored in said frame memory; and a pointing device, wherein, for searching for a desired object among a first plurality of different objects, said disk drive, computer, memory, frame memory and display unit are such that:

a first display can be constructed comprising a reduced image of each said object, with all of said reduced images arranged in table form, each said reduced image having been obtained from a respective image of said electronic camera with the corresponding auxiliary data;

said desired one of said objects can be selected from said first display with said pointing device; and a second display is produced showing a second plurality of objects which includes said desired object, said second display being at least in part an image detected by said camera and selected by said computer on the basis of its respective auxiliary data; and the location where said desired object is located in said image of said second display is indicated at that location by a predetermined marking at that position, as a result of said selecting by said pointing device from said first display.

* * * * *